United States Patent
Matsuura

(10) Patent No.: US 7,334,337 B2
(45) Date of Patent: Feb. 26, 2008

(54) METHOD OF MANUFACTURING CYLINDRICAL BEARING MEMBER

(75) Inventor: Tetsufumi Matsuura, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/339,971

(22) Filed: Jan. 26, 2006

(65) Prior Publication Data
US 2006/0123630 A1 Jun. 15, 2006

Related U.S. Application Data

(62) Division of application No. 10/814,088, filed on Mar. 31, 2004, now abandoned.

(30) Foreign Application Priority Data
Apr. 25, 2003 (JP) ............................. 2003-122217

(51) Int. Cl.
B21D 53/10 (2006.01)
(52) U.S. Cl. ........................................................ 29/898
(58) Field of Classification Search .................. 29/898, 29/898.04, 898.1, 898.02, 898.042, 898.067; 384/12, 13
See application file for complete search history.

(56) References Cited

U.S. PATENT DOCUMENTS

| | | | |
|---|---|---|---|
| 1,122,230 A | 12/1914 | Bache | |
| 1,422,655 A * | 7/1922 | Brehmer | ..................... 384/283 |
| 1,557,137 A | 10/1925 | Brincil | |
| 4,535,519 A * | 8/1985 | Kajikawa et al. | ...... 29/890.132 |
| 4,689,864 A * | 9/1987 | Fukuma et al. | .......... 29/890.12 |
| 4,768,268 A | 9/1988 | Ishihara | |
| 5,245,850 A | 9/1993 | Kugler | |
| 5,931,038 A * | 8/1999 | Higashi | .......................... 72/70 |
| 5,934,405 A * | 8/1999 | Place | .......................... 180/441 |
| 5,945,050 A | 8/1999 | Jeong | |
| 6,393,818 B1 | 5/2002 | Nakagawa | |

FOREIGN PATENT DOCUMENTS

| | | |
|---|---|---|
| JP | 59-185539 | 10/1984 |
| JP | 60-168698 | 11/1985 |
| JP | 2963652 | 8/1999 |
| JP | 2001-279301 | 10/2001 |
| JP | 2002-346690 | 12/2002 |

* cited by examiner

*Primary Examiner*—John C. Hong
(74) *Attorney, Agent, or Firm*—Dann, Dorfman, Herrell and Skillman, p.C.; Henry H. Skillman

(57) ABSTRACT

A small-bored cylindrical bearing member which can enhance the maintainability for a lubricating oil therein. The member has blind grooves in a seamless cylindrical central body portion of the interior hollow cylindrical surface of the bearing member. A method of manufacturing the cylindrical bearing member having blind grooves with blocked-in end portions extending in the longitudinal direction of the cylindrical portion and spaced from the ends of the member. The grooves can be easily formed in the central body portion of the inner circumferential cylindrical surface of the central body portion with the blocked-in ends spaced from the opposite ends of the seamless bearing member. The seamless member is first formed with a tapered or flared portion at one open end which is later narrowed into a round cylindrical form. Before narrowing the tapered or flared portion, the blind grooves are formed by a groove punch pushed through the open end into the central body cylindrical portion. After narrowing, the blind grooves have blocked end portions spaced from the opposite ends of the bearing in the longitudinal direction.

3 Claims, 6 Drawing Sheets

METHOD OF MANUFACTURING CYLINDRICAL BEARING MEMBER

RELATED APPLICATION

This application is a Divisional of U.S. application Ser. No. 10/814,088, filed on Mar. 31, 2004 now abandoned which claims priority to Japanese Application No. 2003-122217, filed Apr. 25, 2003. Each of the foregoing applications is hereby incorporated herein by reference.

TECHNICAL FIELD TO WHICH THE INVENTION PERTAINS

The present invention relates to a cylindrical bearing member having a hollow cylindrical bore in which a plurality of blind grooves, which provide reservoirs for a lubricating oil, were formed in an endless inner circumferential surface of a cylindrical bore in parallel to the axial direction of the cylindrical bore, and a method of manufacturing the bearing member. Particularly, the present invention relates to a bearing member having a cylindrical bore in which these blind grooves were blocked without their ends extending to either of the opposite ends of the cylindrical bore and a method of manufacturing the bearing member in small sizes.

BACKGROUND OF THE INVENTION

A cylindrical bearing member, which is used as sliding bearings such as a bearing body for a rotating shaft, a bushing for a chain and the like by inserting a shaft, a pin or the like into the cylindrical bore of the article, has been conventionally well known. As such, a cylindrical bearing member is well known, which is provided with a plurality of grooves, which function as oil reservoirs for a lubricating oil parallel to the axial direction of the cylindrical bearing member, that is grooves, on an inner circumferential surface of the cylindrical bearing member to enhance the lubricating properties between the inner circumferential surface in a cylindrical bore of the cylindrical bearing member, which provides a bearing surface, and a shaft, or between the cylindrical bore and a pin or the like.

In this conventional cylindrical bearing member, the grooves are extended to both ends of the cylindrical bore so that they are open on both ends of the cylindrical bore. Thus, when a shaft is inserted into the cylindrical bore of the cylindrical bearing member to use it as a bearing member while retaining a lubricating oil in the grooves, the lubricating oil flows out of open ends in the blind grooves. Accordingly, there were problems that the oil reserve efficiency is bad and when this cylindrical bearing member is used for a long period of time the lubricating properties are deteriorated.

As a bearing member, which solved such a problem, a cylindrical bearing member in which end portions of the respective grooves in the longitudinal direction of the member were blocked to form blind grooves, has been known (see Japanese Patent Publication No. 2963652)

The above-mentioned known cylindrical bearing member 21 is shown in FIG. 10. The cylindrical bearing member 21 is composed of a cylindrical portion 24, in which a rectangular crude material 22 shown in FIG. 9 was wound into a cylindrical shape, that is, a plurality of blind grooves 23 are formed by pressing, machining or rolling on a surface of the rectangular crude material 22 such as a band steel sheet, a steel sheet or the like, which provide oil reservoirs. These blind grooves 23 are blocked on the respective both ends 23a, 23a in the width direction of the crude material such as a band steel sheet. Then the cylindrical bearing member 21 is wound into a cylindrical article (cylindrical portion) by a machine so that both ends of the rectangular crude material such as the band steel sheet are opposed, and a core punch is inserted into this cylindrical article to push it into a circular shape to manufacture a round cylindrical portion 24. In the thus manufactured cylindrical bearing member 2, a seam 25 between butted portions in the rectangular crude material 22 form a groove portion.

Further, since the cylindrical bearing member 21 is formed by winding, it is a comparatively thin member. However, as another cylindrical bearing member comprising a thick cylindrical portion, a cylindrical bearing member may be used in which blind grooves for oil reservoirs were previously formed on an inner surface, that is an inner circumferential surface (bearing surface) of a cylindrical portion with a thick wall, whose outer surface was forged to a round by undercutting, broaching or the like.

Japanese Patent Publication No. 2963652 also discloses a conventional cylindrical bearing member which is formed by winding a rectangular crude material so that the ends of the rectangular crude material are in a butted state. Thus, there is a problem that this butted portion forms a seam in the width direction of the cylindrical portion. This seam provides a groove portion having no bottom. Thus there is a problem that when this cylindrical bearing member is used while inserting a shaft, a pin or the like into this cylindrical bearing member, lubricating oil in the blind grooves leaks on the side of the groove portion formed by the seam and flows out of the ends in the longitudinal direction of the seam for a very short time whereby the lubricating oil cannot be held for a long period of time and the lubricating properties cannot be maintained.

Further, there is a problem that since the cylindrical portion of this cylindrical bearing member is formed by winding a rectangular crude material, manufacturing of a cylindrical portion having a thick wall is difficult and a thick cylindrical portion cannot be formed.

Further, since in the above-mentioned conventional cylindrical bearing member comprising a cylindrical portion having a thick wall, and the blind grooves are formed on the inner circumferential surface of the cylindrical portion by undercutting, broaching or the like, the blind grooves cannot be formed by every one blind groove only, whereby the formation efficiency of the blind grooves are bad, a long time for its processing is needed and the mass production is not suitable, which leads to disadvantageous costs.

SUMMARY OF THE INVENTION

Accordingly, the objects of the present invention are to solve the above-mentioned related art problems and to provide a small cylindrical bearing member, in which maintainability for lubricating oil filled in the blind grooves and oil reserving efficiency can be enhanced by use of seamless cylindrical portion of a cylindrical bearing member and a thin and a relatively thick cylindrical portions can be used, as well as to provide a method of manufacturing a cylindrical bearing member in which blind grooves with blocked-in ends in the longitudinal direction of the cylindrical portion can be efficiently formed on the inner circumferential surfaces thereof.

The present invention has solved said problems based on the concepts that the circumferential portion of a cylindrical bearing member is made seamless and that ends of each blind groove for an oil reservoir in the longitudinal direction are blocked to suppress the oil flow out of the groove. The method of manufacturing the cylindrical bearing member has solved said problems based on the conception of forming blind grooves in which both ends of each blind groove in the longitudinal direction of the cylindrical bearing member were blocked by forming the blind grooves in a forging step with a groove punch. Here the blind groove blocked at both ends in the longitudinal direction of the cylindrical bearing member means a blind groove both ends of which are spaced away from the open ends of the cylindrical portion of the bearing member.

The bearing member of the present invention has a configuration of a cylindrical bearing member characterized in that a plurality of blind grooves, each having blocked end portions in the longitudinal direction, are formed in the inner circumferential surface of a seamless cylindrical portion in parallel with the axial direction of the cylindrical portion and that said blind grooves are forged, e.g., by a groove punch in a forging step.

The bearing embodying the present invention has a configuration of a hollow cylindrical body portion with one end metal-worked from an outwardly tapered or flared condition into a round cylindrical portion. The interior of the central body portion of the bearing has blind grooves, preferably forged while the one end is in tapered or flared condition by a groove punch pushed into the hollow interior of the central body portion from the open tapered or flared end. After restoration of the one end to the round cylindrical condition, the blind grooves are positioned within the central body portion and have blocked ends spaced inwardly from the open ends of the cylindrical bearing member.

The method of the present invention comprises a method of manufacturing a cylindrical bearing member characterized by the steps of: extruding a cylindrical column-shaped forging crude material having required length to form a primary intermediate forged article while leaving a bottom, press-fitting said primary intermediate forged article into a die whose one end was formed in a tapered manner with a tapered or flared punch to form a secondary intermediate forged article having a tapered portion which was opened at one end of the cylindrical portion in a tapered or flared manner, pushing down a grooved punch from an opened end side into the inner portion of an endless cylindrical portion of said secondary intermediate forged article to form a tertiary intermediate article in which a plurality of blind grooves were formed in the inner circumferential surface of the article, press-fitting said tertiary intermediate forged article into a die whose inner circumferential surface is circular to form a fourth intermediate forged article processed in a round shape with said tapered or flared portion narrowed, and punching the bottom portion of said fourth intermediate forged article to form a plurality of blind grooves each having blocked ends in the longitudinal direction of the article, in parallel to the axial direction of the cylindrical portion.

According to one feature of the present invention, a plurality of blind grooves, each blocked-in end portions in the longitudinal direction, are formed in the inner circumferential surface of an endless cylindrical portion in parallel with the axial direction of the cylindrical portion. Thus, in a case where the cylindrical bearing member was used as a sliding bearing by inserting a shaft, a pin or the like into the cylindrical portion of the member, a lubricating oil reserved in blind grooves is not caused to flow out of ends of the cylindrical portion by its use for a long period of time whereby excellent lubricating properties are maintained.

Further, since the blind grooves are formed with a groove punch in a forging step, the blind grooves can be efficiently formed.

According to another feature of the present invention, before decreasing the diameter of a tapered portion opened at an end of the cylindrical portion to process it to a round cylindrical portion, the blind grooves are formed with the groove punch pushed from an open end side of the tapered or flared portion into the cylindrical portion. Thus, the blind grooves having blocked-in ends in a seamless cylindrical portion in the axial direction, can be efficiently formed on the inner circumferential surface of the seamless cylindrical portion.

According to another aspect of the present invention, after forming a cylindrical primary intermediate forged article to a secondary intermediate forged article, a tapered or flared portion in which one end of the article is opened in a tapered or flared manner, a plurality of grooves are formed on the inner circumferential surface of the secondary intermediate forged article by pushing a groove punch into the surface to make a tertiary intermediate forged article. Then this tertiary intermediate forged article is press-fitted into a die having a round inner circumferential surface to make a round fourth intermediate forged article with a narrowed tapered or flared portion. As a result a cylindrical bearing member having blind grooves blocked-in at both ends of the cylindrical portion respectively, can be manufactured.

DESCRIPTION OF THE PREFERRED EMBODIMENTS

Figure 1:
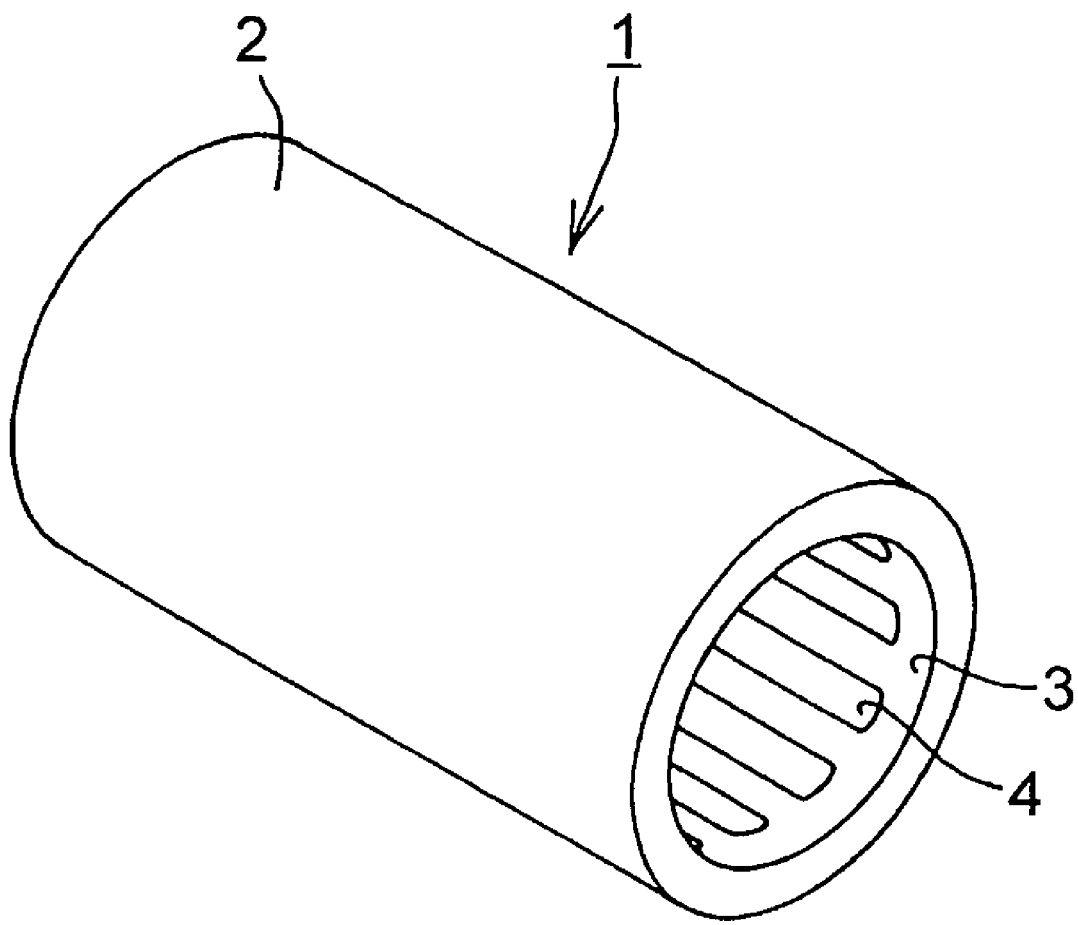
FIG. 1 is a perspective view of a cylindrical bearing member 1 showing an example of the present invention.
Figure 8:
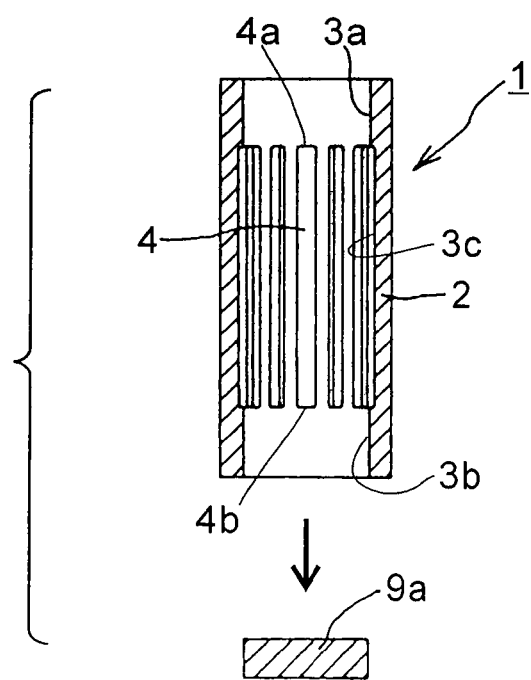
FIG. 8 is an explanatory view showing punching the bottom portion at the end opposite to the flared end in accordance with the present invention.
Figure 9:
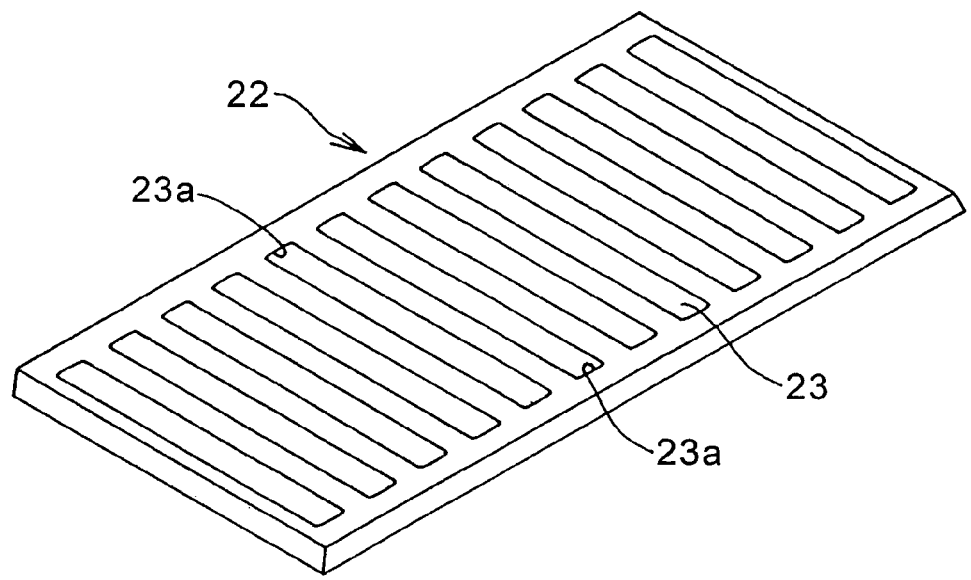
FIG. 9 is a perspective view of a rectangular crude material before winding, showing a prior art example prior to being wound into a cylinder.
Figure 10:
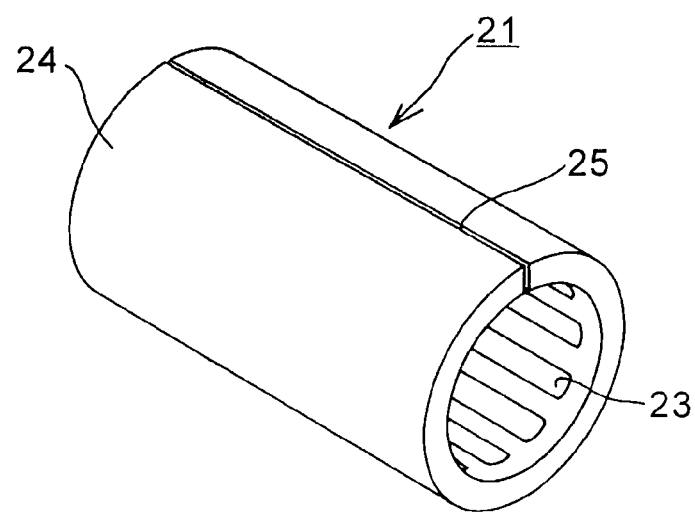
FIG. 10 is a perspective view of a cylindrical bearing member showing the completed prior art example.

A cylindrical bearing member made in accordance with the present invention is illustrated in FIGS. 1 and 8. The bearing member 1 is a hollow cylinder 2 having an inner circumferential surface 3. The interior surface 3 is provided with a plurality of blind grooves 4 parallel to the axial direction of the hollow cylindrical portion 2. As shown in FIG. 8, the blind grooves 4 are formed in the central portion 3c of the inner cylindrical surface of the cylindrical portion 2. The opposite ends of the central body portion 3c are spaced from the open ends of the bearing member 1 to form top portion 3a and bottom portion 3b. The blind grooves 4 are confined to the central body portion 3c and terminate in blocked ends 4a and 4b which are spaced inwardly from the open ends of the cylindrical member 1 so that the end portions 3a and 3b of the inner cylindrical surface are provided with a continuous uninterrupted surface. The spacing from the open ends is preferably greater than the thickness of the hollow cylindrical wall of bearing member, so as to provide an effective barrier against leakage of lubricant out of the bearing member beyond the blocked ends of the grooves. The cylindrical bearing member is seamless as shown in FIGS. 1 and 8.

In accordance with the present invention, the cylindrical bearing member is formed in a series of metal-working steps with the blind grooves being formed by a groove punch in a forging step.

Figure 3:
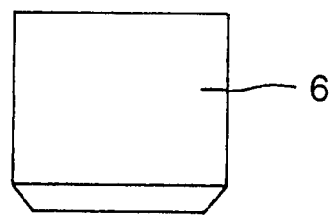
FIG. 3 is a front view of the starting material of FIG. 2 with a modified end portion.

In the first step, a bar-shaped block of metallic starting material, for example a high carbon chromium steel bar-shaped starting material, was cut to the required length in accordance with the length of a bearing member to be manufactured. The starting material is in the form of a solid cylindrical column-shaped component 5. One end of the starting block is modified to the form shown at 6 in FIG. 3 for insertion into a forming die 7 shown in FIG. 4. The end-modified starting block is then extruded with a die 7 and an extruding punch 8 to form a hollow cylindrical primary intermediate shaped article 9 which is open at the top end and is closed at the bottom end by a bottom wall 9a. Preferably, the intermediate article 9 is shaped by the plastic flow of the metallic material.

Figure 2:
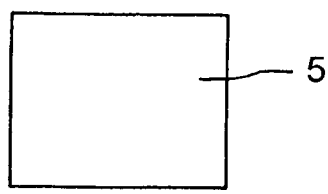
FIG. 2 is a front view of a cylindrical column-shaped starting material showing an example of the present invention.

A method of manufacturing the cylindrical bearing member 1 will be described. First, a bar-shaped metallic crude material, for example a high-carbon chromium steel bar-shaped crude material was cut to the required length in accordance with the size of a bearing member to be manufactured to form cylindrical column-shaped forging materials. In FIG. 2 only one cylindrical column-shaped forging component 5 is shown. Then an end surface of this cylindrical column-shaped forging component 5 was modified to form an end-surface-corrected cylindrical column-shaped forging component 6 shown in FIG. 3.

Figure 4:
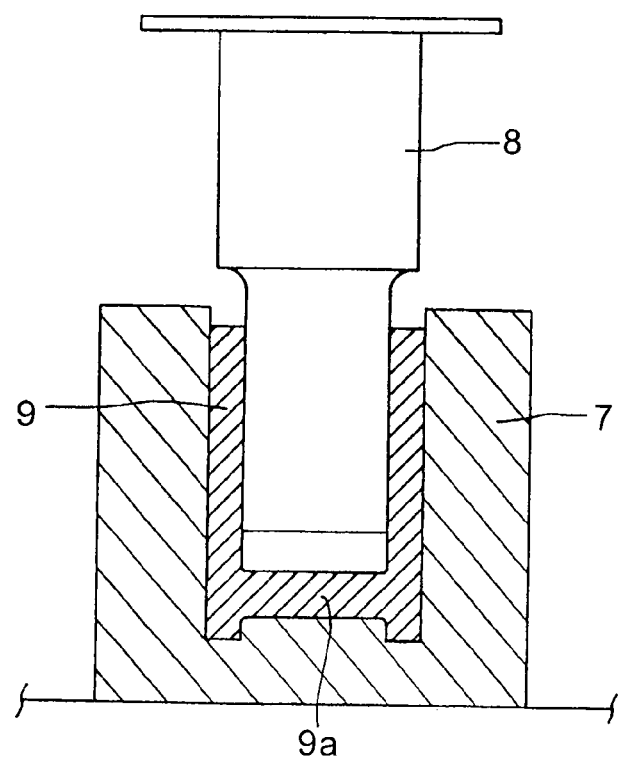
FIG. 4 is an explanatory view showing the modified starting material being forged in accordance with the present invention.

Then, as shown in FIG. 4, the cylindrical column-shaped forging component 6 was cold extruded with a die 7 and a extruding punch 8 to form a cylindrical primary intermediate forged article 9 with a bottom portion 9a by the plastic flow of the metallic material. The end-surface modification of the component 6 facilitates the insertion of the component into the die 7.

Figure 5:
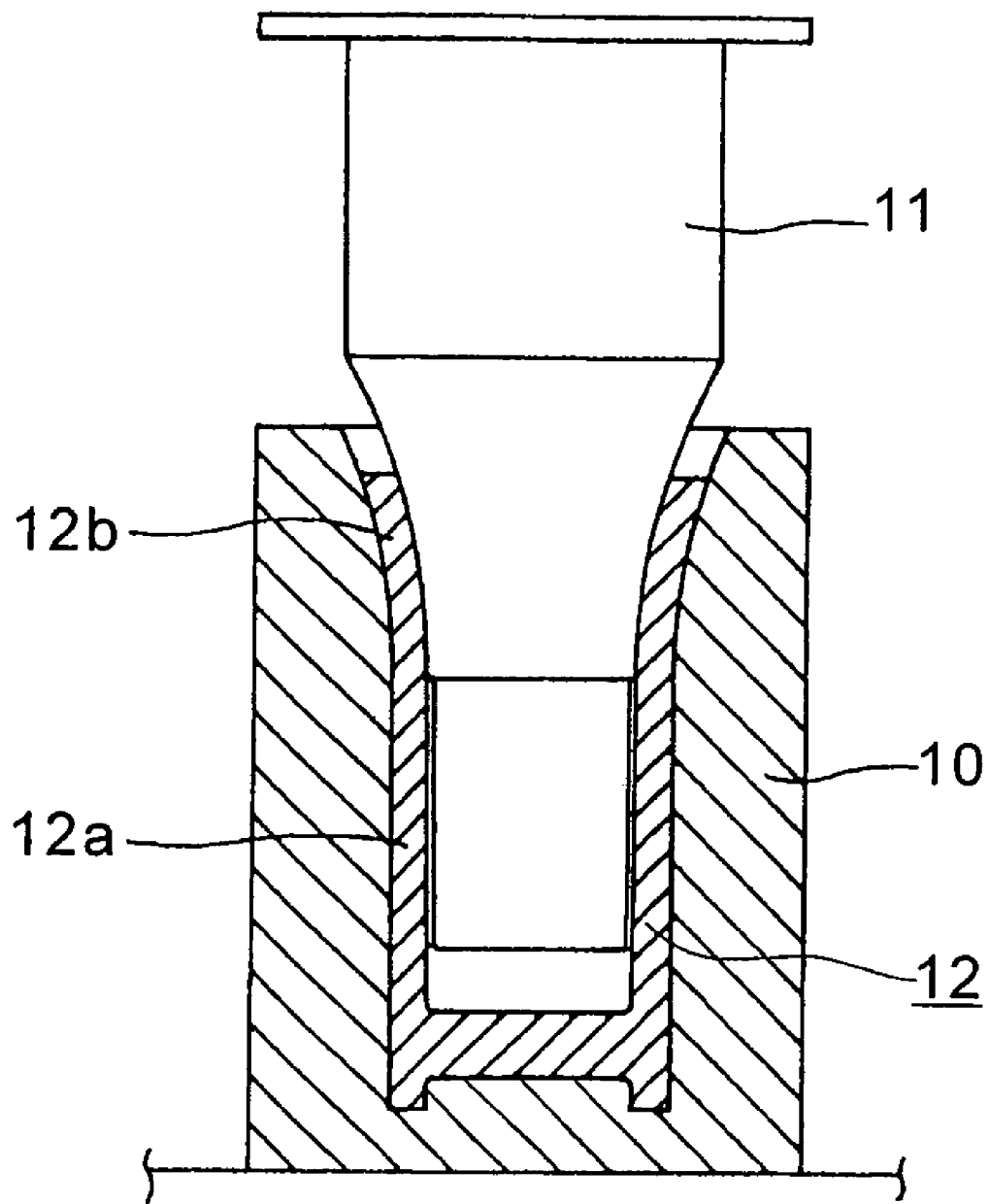
FIG. 5 is an explanatory view showing the working of one end of the material to form a tapered or flared end portion.

Then, as shown in FIG. 5, the cylindrical primary intermediate shaped article 9 was press-fitted into a die 10 whose one end was formed in a tapered or flared shape, with a tapered or flared punch 11 to form a secondary intermediate forged article 12 having a tapered or flared portion 12b so that one end portion the cylindrical portion 12a is opened or diverged in a tapered or flared manner. It should be noted that the portion 12b is limited to the upper end portion of the article 12 and does not extend into the central body portion 12b of the article 12.

Figure 6:
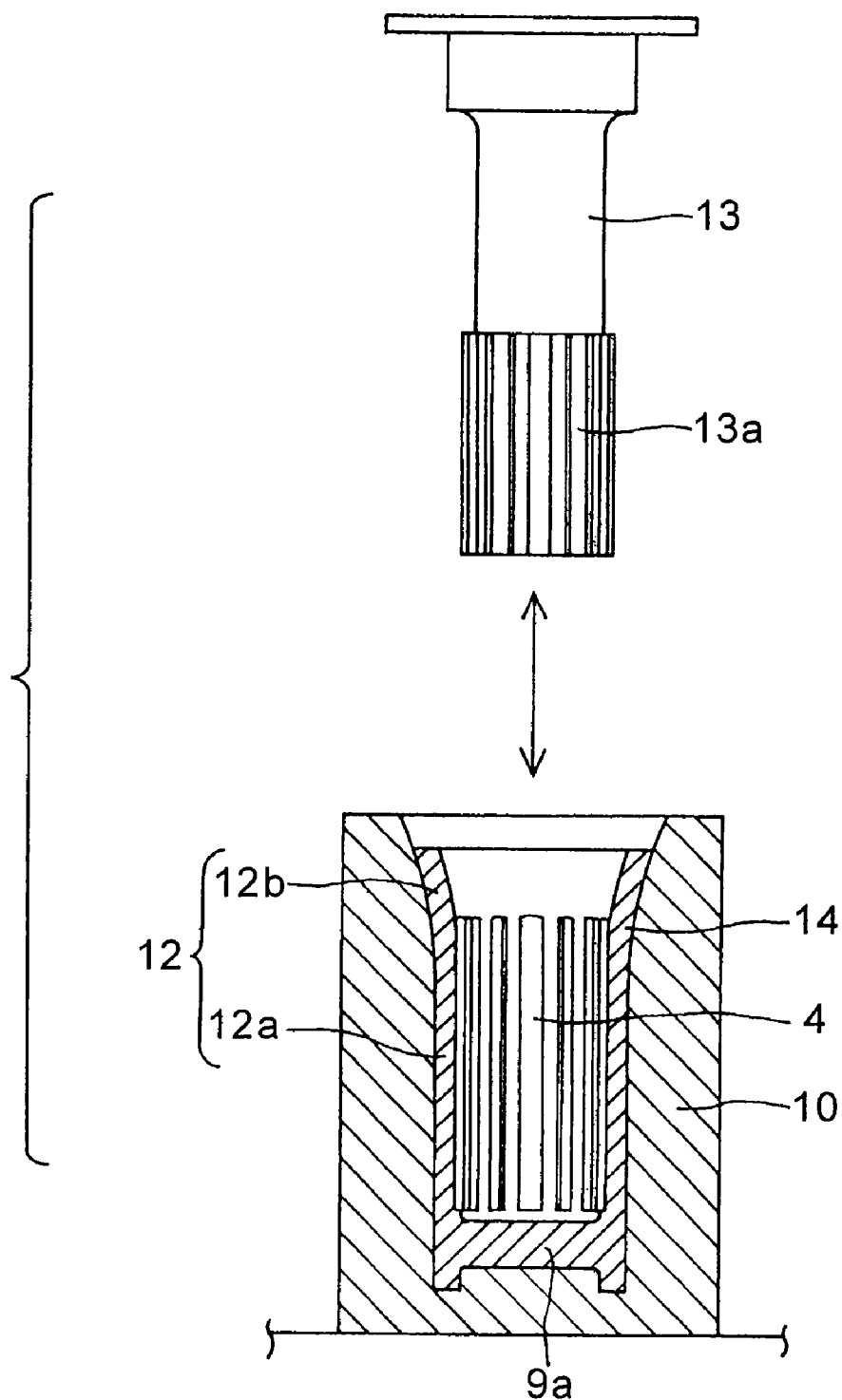
FIG. 6 is an explanatory view showing the formation of blind grooves in the central body portion in accordance with the present invention.

Then, as shown in FIG. 6, a groove punch 13 having convex portions 13a was pushed into the cylindrical portion 12a from an open side through the tapered or flared portion 12b in the secondary intermediate forged article 12 with the secondary intermediate forged article 12 held into the die 10, so that a tertiary intermediate forged article 14 with a plurality of blind grooves 4, parallel with the axial direction of the article and formed on the entire inner circumference surface thereof, was formed. In this case, the leading ends of the blind grooves 4 are blocked by pushing the groove punch 13 to a lower end of the cylindrical portion 12a of the secondary intermediate forged article 12 so that the blind grooves are not penetrated.

Figure 7:
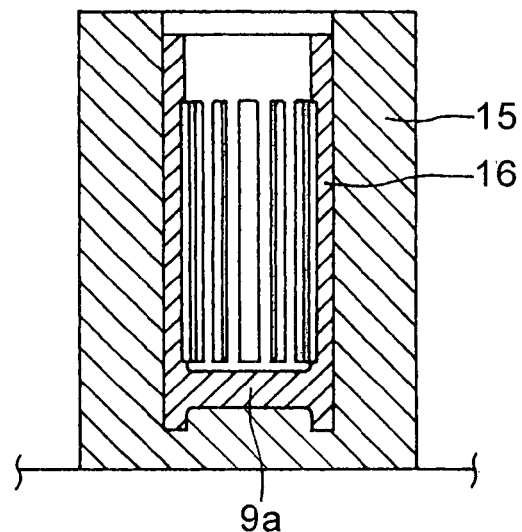
FIG. 7 is an explanatory view of working the flared end portion to a round shape in accordance with the present invention.

Then, the tertiary intermediate forged article 14 having blind grooves 4 in the cylindrical portion 12a and the tapered or flared portion 12b was press-fitted into a die 15 having a round inner circumferential surface with a pushing punch (not shown), as shown in FIG. 7 to narrow the tapered or flared portion 12b in a round shape and form a cylindrical fourth intermediate forged article 16, the outer shape of which has become round. As mentioned above the fourth intermediate forged article 16, which was formed in a round shape, has blind grooves 4 on the inner circumferential surface of the cylindrical portion 12a with the end portions of the grooves blocked.

Finally, in the cylindrical fourth intermediate forged article 16 in which the blind grooves were formed in the above-mentioned forging step, the bottom wall 9a on the bottom portion side of the article 16 was punched out so that an open-ended cylindrical bearing member 1 having blind grooves 4 with both ends blocked at 4a and 4b is completed.

Since in the cylindrical bearing member 1 manufactured in the above-mentioned steps the cylindrical portion 2 has no seam and both ends of the blind grooves formed on the inner circumferential surface are blocked in the longitudinal direction of the member, in a case where the cylindrical bearing member was used as a sliding bearing by inserting a shaft, a pin or the like into the cylindrical portion of the member, a lubricating oil reserved in blind grooves is not caused to flow out of ends of the cylindrical portion by its use for a long period of time whereby excellent lubricating properties can be maintained. The method of the present invention is particularly adapted to the manufacture of small-size bearings whose internal bore is less than 50 mm. It has proved particularly suited to making roller chain bearings whose internal bores are in the range of 5 mm. to 30 mm. A popular size is 6 mm.

Further, according to the above-mentioned manufacturing method, when the blind grooves 4 are formed on the inner circumferential surface 3 of the cylindrical portion 2 in the cylindrical bearing member 1, the seamless cylindrical primary intermediate forged article is formed into the secondary intermediate forged article having an one-end-opened, tapered or flared portion is formed and a plurality of blind grooves are formed on the inner circumferential surface by pushing a groove punch, and then the tapered or flared portion is narrowed to form in a round shape. Accordingly, blind grooves blocked at both ends in the longitudinal direction of the cylindrical portion 2 can be efficiently formed on the inner circumferential surface 3 of the seamless cylindrical portion 2 whereby the cylindrical bearing member 1 can be easily manufactured.

According to the present invention, in the cylindrical bearing member, a plurality of blind grooves, each having blocked end portions in the longitudinal direction, are formed in the inner circumferential surface of a seamless cylindrical portion in parallel with the axial direction of the cylindrical portion. Thus, in a case where the cylindrical bearing member was used as a sliding bearing by inserting a shaft, a pin or the like into the cylindrical portion of the member, a lubricating oil reserved in blind grooves is not caused to flow out of ends of the cylindrical portion by its use for a long period of time whereby excellent lubricating properties can be maintained. Further, since the blind grooves are formed with a groove punch in a forging step, the blind grooves can be efficiently formed, and the manufacturing of the cylindrical bearing member having blind grooves can be easily performed.

According to the present invention, before decreasing the diameter of a tapered or flared portion open at an end of the cylindrical portion to process it to a round cylindrical portion, the blind grooves are formed with the groove punch pushed through an open end of the tapered or flared portion into the cylindrical body portion. Thus, the blind grooves, blocked-in the ends of a seamless cylindrical portion in the axial direction, can be efficiently formed on the inner circumferential surface of the seamless cylindrical portion, and the manufacturing of the cylindrical bearing member having such blind grooves can be easily performed.

According to the present invention, the method of the present invention comprises the steps of extruding a cylindrical column-shaped member having the required length to form a primary intermediate forged article while leaving a bottom wall, press-fitting said primary intermediate forged article into a die whose one end was formed in a tapered or flared manner with a tapered or flared punch to form a secondary intermediate forged article having a tapered or flared portion open at one end of the cylindrical body portion in a tapered or flared manner, and pushing down a grooved punch through the open side into the center body portion of a seamless secondary intermediate forged article to form a tertiary intermediate article in which a plurality of blind grooves were formed in the inner circumferential surface of the article at the center body portion. Thus, in the forging step a number of blind grooves can be efficiently formed on the entire inner circumferential surface of the cylindrical body portion. Further, since the cylindrical portion can be formed in the forging step, thin or thick wall cylindrical portion can be properly formed.

Further, the method of the present invention includes the steps of press-fitting said tertiary intermediate forged article, in which a number of blind grooves were formed on the inner circumferential surface of the cylindrical portion except for the tapered or flared portion in the forging step, into a die whose inner circumferential surface is circular to form a fourth intermediate forged article processed in a round shape with said tapered or flared portion narrowed, and punching the bottom wall of said fourth intermediate forged article. Thus the hollow cylindrical bearing member having a plurality of blind grooves, blocked at both ends of the seamless cylindrical body portion, in the longitudinal direction of the article, can be efficiently, easily manufactured.

The invention claimed is:

1. A method of manufacturing a bushing of a given length for a chain, said bushing having oil-retaining blind grooves, comprising the steps of:

extruding a cylindrical column-shaped metallic member having said given length to form a primary intermediate article having a hollow cylindrical body portion and a bottom wall, press-fitting said primary intermediate article into a die having one end flared by a flared punch to form a secondary intermediate article having a flared end portion open at one end of the cylindrical member in a flared manner, and an inner cylindrical portion beyond said flared end portion, pushing down a grooved punch from said one open end into said inner cylindrical portion of said secondary intermediate article to form a tertiary intermediate article having a plurality of grooves formed only in said inner cylindrical portion of the article, press-fitting said tertiary intermediate article into a die whose inner circumferential surface is circular to form a fourth intermediate forged article entirely processed in a round shape with said flared portion narrowed in cylindrical form, said fourth intermediate forged article being closed beyond the bottom ends of said grooves by said bottom wall, and punching out the bottom wall of said fourth intermediate forged article, said fourth intermediate forged article forming a bushing having a plurality of blind grooves, each having blocked ends spaced from the top and bottom ends of the article in the longitudinal direction, parallel to the axial direction of the cylindrical body portion.

2. A method according to claim 1 wherein said extruding step forms a hollow cylindrical wall of a given thickness forming a bore of less than 50 mm, and said flared end portion has an axial length greater than said given thickness, whereby said blind grooves terminate spaced from the top end of the fourth intermediate article after the teritary intermediate article is processed into a round shape.

3. A method according to claim 1 wherein said press fitting step is performed by extruding the tertiary article into a hollow cylindrical die with a solid cylindrical extruding punch, and said step of pushing down a grooved punch into the inner cylindrical portion of the article forms said blind grooves by cold extrusion of said cylindrical portion of said tertiary intermediate article.

* * * * *